INVENTOR
F. VOLLENSCHIER
BY Robert Harding Jr.
ATTORNEY

INVENTOR
F. VOLLENSCHIER
BY Robert Harding Jr.
ATTORNEY

United States Patent Office 2,878,320

Patented Mar. 17, 1959

2,878,320

CIRCUIT ARRANGEMENT FOR TELECOMMUNICATION SYSTEMS, IN PARTICULAR TELEPHONE SYSTEMS

Fritz Vollenschier, Stuttgart-Zuffenhausen, Germany, assignor to International Standard Electric Corporation, New York, N. Y., a corporation of Delaware Application August 5, 1954, Serial No. 447,970

Claims priority, application Germany August 13, 1953

7 Claims. (Cl. 179—18)

This invention relates to a circuit arrangement for telecommunication systems, in particular, for telephone systems in which multiswitches, composed of individual switches, are used as switching elements.

Such switches consist of a stationary contact bank, containing a plurality of spring sets, a number of selecting bars, and a certain number of connecting bars. The selecting bars are appropriately arranged vertically in relation to the connecting bars, as is usually the case with the well-known embodiments according to the crossbar principle. The selecting bars, as well as the connecting bars, are made effective by means of magnets individually assigned thereto.

The connecting bars in connection with the spring assemblies assigned thereto represent the said single switches by means of which independent connections can be made, whereas the selecting bars, serving to identify the spring assemblies which are to be switched-on later, are provided in common for all of the employed single switches. As is well known, such a common selecting device merely permits the performance of selecting operations performed successively.

The invention is particularly concerned with circuit arrangements relating to hunting selections, e. g. in group switching stages, and employing the said multiswitch with the common selecting device.

Hunting operations with the aid of step-by-step selectors (such as rotary selectors, two motion selectors or motor-driven selectors) are usually performed in such a manner that the wiper of the selector is stepped on, either in a sep-by-step manner or sweepingly over the contacts of the group, until the wiper is arrested after testing the contact of an idle outlet.

Owing to the fact that such hunting operations cannot be performed with switches having stationary switching elements, the selection of an idle outlet must be made by employing other means.

The setting of such switching elements by the application of marking potentials is known from the multiswitch art. These arrangements, therefore, can also be applied appropriately to hunting operations, i. e. in such a manner that the desired idle outlet will be marked in the common selecting device of the multiswitch.

Furthermore, with circuit arrangements for hunting operations, the hunting of an idle outlet must also be possible when employing graded multiples for the outlets extending via several groups of switches.

According to the invention the problem of performing hunting operations for multiple switches will be solved in such a way that the individual connecting elements of the common selecting device for hunting an idle outlet will be marked via one or more contact chains of the relays indicating the busy condition of the outlets.

Figure 1:
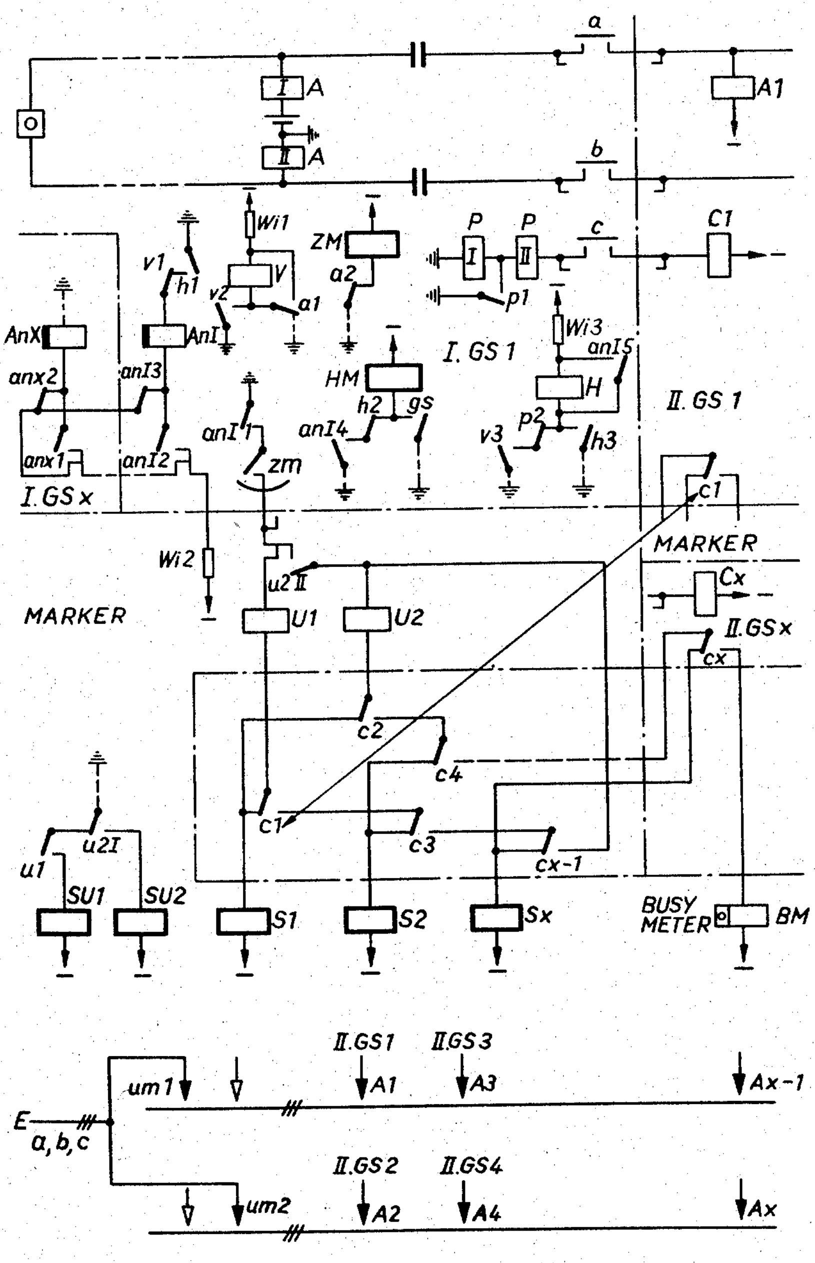
Figure 2:
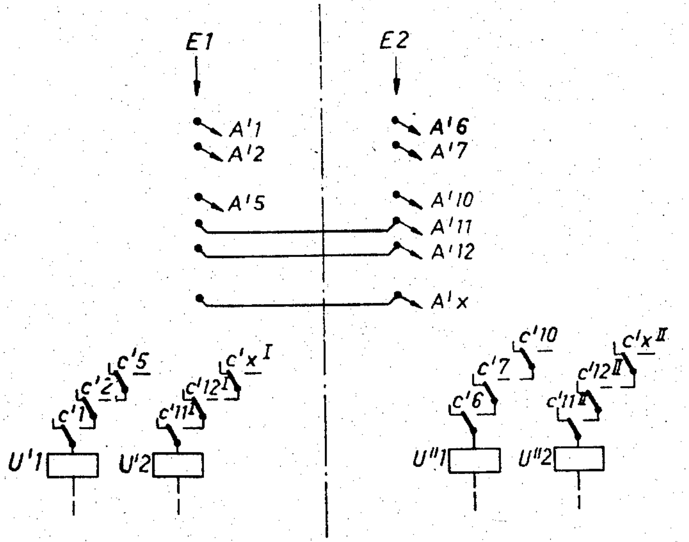

The invention will now be particularly described with reference to one embodiment shown in the accompanying drawing, in which:

Fig. 1 is a schematic circuit diagram of a multiswitch circuit embodying the invention; and Fig. 2 is a circuit diagram showing certain chain circuits used for marking the multiswitch select magnets.

Fig. 1 shows the selecting magnets S1, S2 . . . S*x* serving the actuation of the switching elements of the common selecting device of a multiswitch. If, for example, the magnet S1 is being energized, then the outlets A1 and A2, shown at the bottom of the figure, will be simultaneously marked thereby. This marking is effected, for example, according to the conventional crossbar system, whereby the outlets A1 and A2 are identified by way of mechanical marking means, e. g., selecting fingers, in such a way that when the connecting bar (not shown) becomes effective, the spring sets, which are associated with the said outlets, will be connected through.

Furthermore, in Fig. 1 the two supplementary magnets SU1 and SU2 are shown which serve the marking of the supplementary contact *um*1 and *um*2 respectively, which are arranged in the contact bank consisting of spring sets of a crossbar switch. At the simultaneous energization of one of the selecting magnets S1 to S*x* and one of the supplementary magnets SU1 and SU2, one predetermined outlet A will be connected with the input E. The connections between the inputs and the outlets are designed as multiwire connections, as is denoted by the multiple signs in the drawing.

Further 2 chains of contacts, *c*1, *c*3 . . . *cx*1 and *c*2, *c*4 . . . *cx* are shown. These contacts are associated with the seizing relays C1 to C*x* of the outlets leading to the next switching stage. Thus, via the first chain of contacts an access is provided to the outlets A1, A3, and the odd numbered outlets including the penultimate outlet A2–1, and via the second chain of contacts access will be obtained to the outlets A2, A4, and the even numbered outlets including the last outlet. In the marking circuit of the first chain of contact a switch-over relay U1 is arranged in series with the respective selecting magnet S to be energized. If so required, said switch-over relay U1, with its contact *u*1, operates the supplementary magnet SU1. In the circuit of the second chain of contacts the switch-over relay U2 is arranged which, in the case of performing a selecting process, operates the supplementary magnet SU2 over contact *u*2I.

The mode of operation of this circuit arrangement is such that after seizing a group selecting stage, i. e. the primary group selector switch I.GS1, the feeding bridge relay A will be energized over its primary and secondary windings. When the calling subscriber initiates his group selection, then relay A, according to the dialled number, will drop off and reoperate repeatedly, following the dialled impulses. During this process, contact *a*2 serves to apply the dialled number to a magnetic counter ZM, serving the identification of the selected group by selecting a marker associated with the selected group on the contact bank *zm* of the counter. Over contact *a*1, the short circuit of the control relay V will be interrupted in the rhythm of the impulses, so that the latter will pull up during the group selection and establishes a holding circuit of its own during this time with the aid of contact *v*2. Contact *v*3 serves to energize an auxiliary relay H which also remains energized via a contact *h*3.

After the termination of the group selection, the relay V will drop off, so that by the reversed contact *v*1, the starting relay A*n*I will be energized via a chain of contacts of the starting relays of other group selector switches for the purpose of seizing the marker. By the operation of this relay, the marker will be seized and selected. The starting chain will be disconnected over the contact *an*I2, so that during this time no other group selector switch has access to the marker. The auxiliary relay H will be shorted over contact *an*I5, so that it will drop off with delay for breaking the seizing circuit with the aid of contact *h*1. The identification of the group selection, which was received by the group magnet (magnetic counter) ZM, is transferred with the aid of contact *an*I1 via the contact bank *zm* to the marker, so that in this circuit the switch-over relay U1 is energized in series with the selecting magnet S1 provided the first lead or outlet A1 has not been previously seized (contact *c*1 actuated). On account of the operation of the switch-over relay U1, the contact *u*1 thereof causes the pulling up of the supplementary magnet SU1. Therewith the marking of the desired outlet is effected. The connecting-through magnet HM will be energized by the dropping of the above-acting auxiliary relay H via the contact *an*I4 and the already dropped off contact *h*2, for connecting through the lead identified by the marker.

Assuming that the outlets 1 and 3 are engaged, then the contacts *c*1 and *c*3 in the marker are reversed, so that the switch-over relay U1 is energized in series with the selecting magnet S*x*. Said selecting magnet S*x* causes the marking of the outlets A*x*–1 and A*x*. The switch-over relay U1, energized in the same circuit, causes the energization of the supplementary magnet SU1 over its contact U1. The latter serves the marking of the supplementary contact *um*1. If, thereupon, the not shown connecting bar is operated by the magnet HM, then the contacts just marked will be connected through, so that in the described example the input E is connected with the outlet A*x*–1 via the supplementary contact *um*1.

If it should happen that all of the outlets, which are being identified by the first row of contacts, are engaged, then the second row of contacts will become effective. The switch-over relay U1 will then be energized over the operated contacts *c*1, *c*3 and *cx*–1 and the second switch-over relay U2 in series with the selecting magnet S1. As described, the first switch-over relay U1 had been energized by contact *u*2II. Accordingly, the supplementary magnet SU2 will be energized via contact *u*2I. In this case the desired outlet (A2) is identified in the marker by the energization of the magnets S1 and SU2. The operation of the connecting-through magnet is effected in the manner as described hereinbefore.

If all of the outlets A are engaged, then the last chain of contacts (*c*2, *c*4, *cx*) serves to switch-on a busy meter BM.

Fig. 2 likewise shows the chains of contacts which are required for marking the selecting magnets, but for the case of employing graded multiples for the outlets extending via several groups of switches. In this case two inputs, i. e. $E_1$ and $E_2$ are shown. The inputs $E_1$ are associated, for example, with the first group of switches, and the inputs $E_2$ with the second group. The corresponding outlets are now so distributed that, for the first inputs, the outlets A'1, A'2, A'5 are individually accessible, and that the outlets A'11, A'12 and A'*x* can be attained in common with the inputs $E_2$. The contact chains serving to mark the selecting magnets for the individual groups of switches are arranged in this case in such a way that to each group of switches those contacts are assigned which mark the outlets accessible by this particular group of switches. In what manner the individual contacts are to be distributed to the individual chains, depends on the grouping and switching possibilities of the respective employed multiswitch.

What is claimed is:

1. A circuit arrangement for hunting operations in telecommunication systems using multiswitches composed of individual switches for completing connections, comprising a multiswitch having individual switches and a plurality of outlets, a relay for each outlet adapted to be operated when said outlet is engaged and having a contact, a pluralilty of selecting members for said switch, and means including the contacts of said relays connected in a chain for selectively operating said selecting members depending on the operated condition of said relays.

2. A circuit arrangement, according to claim 1, in which each selecting member is adapted to select a plurality of the switch outlets for marking, and separate means controlled by the operated condition of the relays for marking one outlet from those selected for marking.

3. A circuit arrangement, according to claim 2, in which the contacts of the relays are arranged in a plurality of chains there being one chain for each switch outlet in the plurality of outlets selected by a selecting member for marking, the separate marking means being controlled respectively, by each chain of contacts.

4. A circuit arrangement, according to claim 3, further comprising switching means in the circuit of each chain of contacts adapted to operate the associated separate marking means.

5. A circuit arrangement, according to claim 4, in which the chains of contacts are connected in series, corresponding contacts of the chains being connected to the respective selecting members, whereby when the switch outlets associated with one chain are all engaged and the associated relays are operated, the next successive chain of contacts becomes effective.

6. A circuit arrangement, according to claim 5, further comprising a metering device, and means for operating said metering device when all the relays associated with the contact chains are operated.

7. A circuit arrangement, according to claim 6, in which the outlets of said switch are arranged in groups connected in graded multiples, the individual contacts which mark the outlets accessible by a particular group of switches being assigned to the chain of contacts controlling that group, whereby the outlets associated with individual groups of switches can be marked via the individual contacts.

References Cited in the file of this patent

UNITED STATES PATENTS

| | | |
|---|---|---|
| 2,430,316 | Voss | Nov. 4, 1947 |
| 2,519,849 | Ostline | Aug. 22, 1950 |
| 2,575,882 | Lundkvist | Nov. 20, 1951 |
| 2,583,848 | Johnson | Jan. 29, 1952 |
| 2,617,888 | Shepherd | Nov. 11, 1952 |
| 2,816,961 | Jones | Dec. 17, 1957 |